Jan. 6, 1959 B. V. VONDERSCHMITT 2,867,750

ADJUSTABLE VOLTAGE SUPPLIES

Filed March 15, 1954

INVENTOR.

BERNARD V. VONDERSCHMITT

BY Oliver J. Mitchell

ATTORNEY 2,867,750

ADJUSTABLE VOLTAGE SUPPLIES

Bernard V. Vonderschmitt, Merchantville, N. J., assignor to Radio Corporation of America, a corporation of Delaware Application March 15, 1954, Serial No. 416,050

12 Claims. (Cl. 315—22)

This invention relates generally to high voltage supplies and more particularly to adjustable high voltage supplies of the type suitable for use to satisfy the adjustable focus voltage requirements of a cathode ray tube.

In cathode ray tubes, beam focusing may be effected electromagnetically or electrostatically. While in the monochrome television art the use of electromagnetic focusing generally predominates, the use of electrostatic focusing is on the other hand quite extensively practiced in most color kinescopes presently contemplated. The focus voltage requirements for a typical tricolor kinescope, such as one of the three-gun shadow-mask type described in the article by H. B. Law entitled "A Three-Gun Shadow-Mask Color Kinescope," appearing in the October 1951 issue of the Proceedings of the I. R. E., are significantly more severe than those of a conventional electrostatically focused black-and-white kinescope. Thus, for example, a variable focus voltage of the order of approximately 2300 to 4000 volts may be required with an anticipated range of load current variations in accordance with picture content of approximately 0 to 400 microamperes. To satisfy such voltage and load requirements with acceptable regulation, it will be appreciated that the variable focus supply must have a low source impedance.

It is a conventional practice to develop a focus voltage for a kinescope via rectification of the high amplitude transient voltage pulse appearing in the kinescope's associated horizontal deflection wave output transformer during each retrace period of the line scanning cycle, when cutoff of the horizontal output tube causes a sudden collapse of the magnetic field in the horizontal deflection yoke. The usual focus voltage supply of this type simply involves connecting a diode and a series bleeder resistance across a suitable portion of the horizontal output transformer, and adjustably tapping the bleeder resistance to derive the variable focus voltage. The use of the bleeder, which must be of appropriate ohmic value to provide reasonable regulation, necessarily involves significant power losses which lessen the overall efficiency of the deflection and voltage supply system. Application of the simple variably-tapped bleeder type of supply to meet voltage and load requirements of the range indicated above for a typical tri-color kinescope involves a considerably greater amount of wasted power than the comparable monochrome kinescope application, since an exceptionally stiff bleeder would be required to provide a reasonably regulated supply.

In accordance with the present invention, a novel and improved adjustable voltage supply is provided, which, as applied to a solution of focus voltage requirements for a kinescope, provides excellent regulation with a minimum power loss. In accordance with a particular embodiment of the present invention, such a voltage supply involves the use of a pair of coils connected in series, one coil being effectively shunted across a suitable portion of the horizontal output transformer, the stepped-up pulse voltage appearing across the series pair being rectified to obtain the focus voltage, and adjustment of such focus voltage being effected by varying the coupling between the series-connected coil pair. Such coupling variation may be carried out, in accordance with an embodiment of the invention, by adjusting the position of a ferrite slug within a common core upon which the two coils are mounted. A supply in accordance with the invention has the advantages of presenting a low source impedance, whereby acceptable regulation may be achieved while avoiding the susbtantial power losses inherent in the alternative employment of bleeder resistances, these advantages being achieved with a likely saving in cost over the less desirable bleeder type supply.

Accordingly it is a primary object of the present invention to provide a novel and improved adjustable voltage supply.

It is a further object of the present invention to provide a novel voltage supply which provides acceptable regulation with minimum power losses.

It is an additional object of the present invention to provide a novel adjustable voltage supply for a cathode ray tube, the supply having a low source impedance and involving a minimum of wasted power.

It is another object of the present invention to provide a novel and improved variable focus supply for a color kinescope.

Other objects and advantages of the present invention will become readily apparent to those skilled in the art upon a reading of the following detailed description and an inspection of the accompanying drawings in which.

Figures 1, 2, 3:
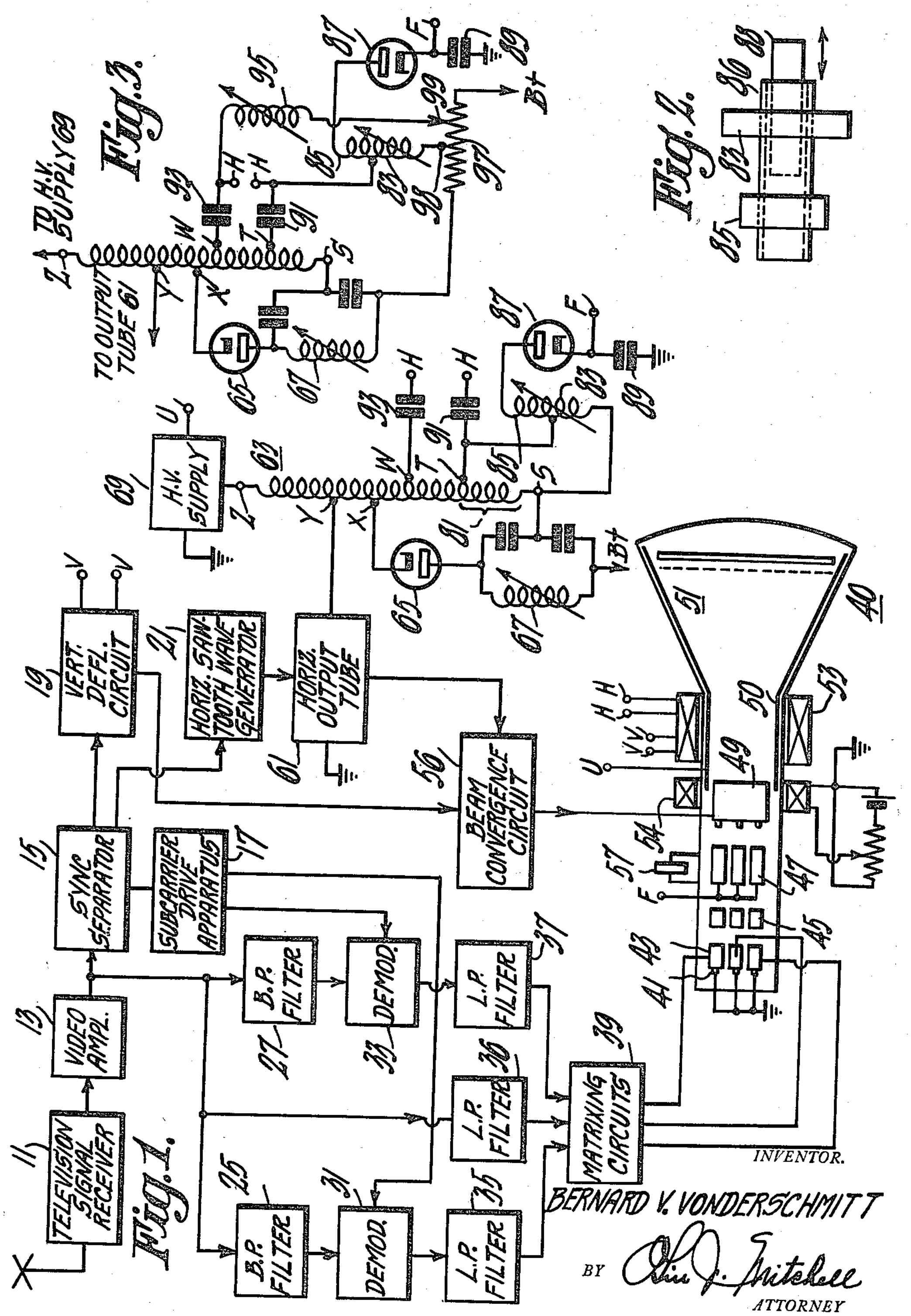
Figure 1 illustrates by block and circuit diagram a television receiver including a variable focus supply in accordance with an embodiment of the present invention.
Figure 2 illustrates a typical construction of elements of the focus suply of Figure 1 in accordance with an embodiment of the present invention.
Figure 3 illustrates schematically a modification of the focus supply of Figure 1 in accordance with a further embodiment of the present invention.

Referring to Figure 1 in greater detail, an adjustable voltage supply in accordance with an embodiment of the invention is illustrated as supplying the variable focusing voltage required by a color kinescope in a color television receiver. While the particular use of the present invention in a color television receiver is thus indicated, it will be appreciated that the invention may also be employed as a supply for other purposes, such as supplying the variable focus voltage required by an electrostatically focused black-and-white kinescope in a monochrome television receiver.

The illustrated receiver is generally representative of presently contemplated color receivers for a simultaneous subcarrier type color television system in accordance with the revised FCC color standards, and is in general accord with the principles and apparatus discussed in the article entitled "Principles and Development of Color Television Systems," by G. H. Brown and D. G. C. Luck appearing in the June 1953 issue of the RCA Review. Carrier waves modulated by a composite color picture signal are illustrated as being received by conventional signal receiving apparatus 11 which may include the usual RF tuner, converting apparatus, IF amplifier, signal detector, etc. The video frequency signals recovered from the modulated carrier in the receiving apparatus 11 are amplified in the video amplifier 13. Synchronizing information is derived from the recovered signals in the sync separator 15 and utilized to synchronously control the receiver's subcarrier drive apparatus 17, to control the generation of scanning waves in the vertical deflection circuits 19, and control the generation of horizontal frequency sawtooth voltage waves in the horizontal sawtooth wave generator 21. Respective color mixture signals (e. g. narrow band $E_Q$ signals and wider band $E_I$ signals, discussed in detail in the aforementioned article) are recovered from the video signal output of amplifier 13 in respective color demodulator channels which include bandpass filters 25 and 27 of respectively appropriate passbands, synchronous demodulators 31 and 33 receiving respectively appropriate phases of the output of the subcarrier drive apparatus 17, and low pass filters 35 and 37 having the respective appropriate narrow and wider responses. The receiver is also provided with a brightness channel, including a low pass filter 36 having the desired wide band response, through which the broad band monochrome portion of the composite picture signal may pass. The outputs of the brightness channel and two color channels are suitably combined in the matrixing circuits 39 of the receiver to recover the simultaneous color signals which may be applied to appropriate elements of a color image reproducer 40.

The color image reproducer 40 is illustrated schematically as being of the three-gun, shadow-mask kinescope type. Color image reproducers of this general type are discussed in some detail in an article by H. B. Law entitled "A Three-Gun Shadow-Mask Color Kinescope," and appearing in the October 1951 issue of the Proceedings of the I. R. E. In a color image reproducer of this type, three electron beams are used, one for each primary color. The beams strike a phosphor screen composed of a regular array of red-, green- and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green- and blue-emitting phosphor dot with the centers of the dots lying at the corners of an equilateral triangle. The trios themselves lie at the corners of an equilateral triangle of larger size. Associated with each of the phosphor trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated the three electron beams are developed and shaped in respective electron gun structures, each including a thermionic cathode 41, a control grid 43, a first anode or accelerating electrode 45, and a focusing electrode 47. The electron gun structure may be of the general type disclosed in the co-pending application of Hannah C. Moodey, Ser. No. 295,225, filed June 24, 1952, and disposed symmetrically about the tube axis such as to produce three substantially parallel beams as in said Moodey application, or may be inclined at respective angles to the tube axis so as to provide three beams substantially converging at a common point on the target, as in the co-pending application of Albert M. Morrell, Ser. No. 364,041, filed on June 25, 1953, now U. S. Patent No. 2,752,550, issued January 26, 1956.

A common convergence anode 49 is illustrated, which when energized by suitable dynamic convergence waveforms generated in the beam convergence circuits 56 along with an appropriate (static convergence) D. C. component, serves to converge the three beams to a common point in the plane of the shadow-mask of target structure 51 throughout the scanning of the raster. The principles of multibeam convergence, and a description of typical circuits for developing dynamic convergence waveforms from sawtooth waves of field and line frequency may be found in an article by Albert W. Friend appearing in the October 1951 issue of the Proceedings of the I. R. E. and entitled "Deflection and Convergence in Color Kinescopes." As illustrated, the beam convergence circuits may derive the respective sawtooth information from the vertical deflection circuits 19 and the horizontal output system 61, and convert these sawtooth waves into essentially parabolic waveforms, as disclosed in the aforementioned Friend article, for combined application with a D. C. component as a suitable convergence waveform to the common convergence electrode 49.

While the use of electrostatic convergence apparatus has thus been illustrated, an alternative is the use of electromagnetic convergence apparatus such as disclosed in the co-pending application of Hunter C. Goodrich, entitled "Electromagnetic Beam Convergence Systems for Tri-color Kinescopes," Ser. No. 322,653, filed November 26, 1952, now U. S. Patent No. 2,707,248, issued April 26, 1955, in the aforesaid co-pending Morrell patent, and in another co-pending application of the aforesaid Morrell, Ser. No. 383,340, filed September 30, 1953, entitled "Tri-color Kinescope," now U. S. Patent No. 2,847,600, issued August 12, 1958. In the aforesaid co-pending patents, the incorporation of internal pole pieces in such electromagnetic convergence apparatus is disclosed.

Three beam alignment magnets 57, one associated with each of the three electron beams may be employed to provide individual correction of beam misalignment, as disclosed in the aforementioned Friend article. However, where electromagnetic convergence apparatus is employed of the nature providing individual control of the three beams in respective radial directions relative to the tube axis, as in the aforementioned Goodrich and Morrell applications, a single beam alignment magnet providing control of a selected one of the beams in a direction perpendicular to the radial convergence control direction associated with that beam is sufficient, again as indicated in the aforementioned Goodrich and Morrell applications. In such a case the single beam alignment magnet may take the form of an adjustably insertable magnet associated with cooperating external and internal pole pieces, as disclosed in the co-pending application of Max Obert, Ser. No. 405,445, filed January 21, 1954, and entitled "Electron Beam Control Means," now U. S. Patent Io. 2,769,110, issued October 30, 1956.

In addition to the beam controlling apparatus already described, the illustrated color kinescope 40 is also provided, as is generally customary, with a "color purity" yoke 54, applying a uniform transverse magnetic field to all the electron beams to orient the system of beams as desired. The yoke may comprise either a rotatable single pair of coils, or two fixed pairs of coils at right angles, fed from an adjustable source of D.-C. (as indicated on the drawing). The use of such a "purity coil" to deflect the three beams equally so that they may be adjusted to pass through their respective color centers is explained in greater detail in the aforesaid Friend article, and in the co-pending application of Friend, Ser. No. 202,185, filed December 22, 1950, and entitled "Beam Alignment Device," now U. S. Patent No. 2,719,249, issued September 27, 1955.

The kinescope is provided, as is conventional, with a final accelerating electrode, the ultor 50, which may take the usual form of a conductive coating on the inner surface of the kinescope 40 extending from the vicinity of the convergence electrode 49 to the beam target structure 52. Where the flared portion of the kinescope envelope is itself a conducting metal, the conductive coating need only extend forward sufficiently to make electrical contact with the metal flared portion. Operating potential for the ultor 50 is developed in a suitable high voltage supply 69, which may, as illustrated, be of the pulse type involving rectification of flyback pulses appearing periodically in the horizontal deflection wave output transformer 63. The high voltage supply 69 may also conveniently serve as the source of D.-C. (static convergence) voltage for the convergence anode 49. To effect deflection of the three beams to trace a scanning raster on the target structure 51, a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied. The horizontal yoke terminals H—H derive line frequency scanning waves from the horizontal output transformer 63, energized by a current developed in the horizontal output tube 61 to provide the desired scanning sawtooth in the horizontal yoke. The illustrated horizontal output transformer 63 is of the autotransformer type, the output of the horizontal output tube 61 being applied across a selected portion of the total series of windings, and the horizontal yoke being effectively coupled across a smaller segment of this portion.

To prevent the transient flyback pulses generated during retrace periods from setting up a series of oscillations, and in accordance with well-known reaction scanning principles, a damper tube 65 is provided. The details of yoke and damper connections and associated circuitry, including the provision of a B-boost capacitor, a linearity control inductance 67, D.-C. blocking capacitors 91, 93 etc., are illustrative only, and various modifications, augmentations or revisions thereof may be achieved without departing from the scope of the present invention, the particularly novel feature of which resides, in the illustrated embodiment, in the focus supply now to be described.

In accordance with the invention a selected winding portion 81 of the output transformer 63 is shunted by a first inductance coil 83. Coupled in series with the coil 83 are a second inductance coil 85, suitable rectifying means, such as diode 87, and a storage capacitor 89, the series circuit being completed from the grounded side of the capacitor 89 through the B+ source and the capacitor associated with inductor 67 to the point S. The rectifying means or diode circuit 87 and 89 may be said to be connected across both the series connected coils 83 and 85 to peak detect the voltage at the upper end of coil 85. The point S is at the low voltage end of transformer 63 and point Z is at the high voltage end of the transformer so far as the deflection signal is concerned. The voltage at the upper end of coil 85 is at a higher value than that at point T because of the step-up action of the autotransformer constituted by coils 83 and 85. As indicated on the drawing by the arrow, the coupling between coil 83 and coil 85 is variable. The focus voltage terminal F, to which the kinescope's focus electrodes 47 are connected, is coupled to the junction point between the diode 87 and the storage capacitor 89.

Operation of the novel focus supply may be briefly stated as follows. The flyback pulses, periodically developed via collapse of the yoke's magnetic field during retrace periods of the horizontal scanning cycle, and appearing across transformer portion 81 and consequently across coil 83 with a relatively moderate pulse potential, may appear with a stepped-up potential at the plate of diode 87 due to the autotransformer action of coils 83 and 85. The amount of step-up of course depends upon the degree of coupling between coils 83 and 85, and therefore the D.-C. focus voltage at terminal F developed via rectification of diode 47 of the applied pulses may conveniently be adjusted by variation of such coupling. At one extreme of such adjustment, where there is substantially no coupling between coils 83 and 85, no step-up may occur, and the pulse potential applied to diode 87 may even appear attenuated relative to the potential of pulses appearing across winding portion 81 and coil 83 due to the voltage drop across coil 85. It may thus be seen that a relatively wide variation in focus voltage may be attained in accordance with the embodiment of the present invention, though the focus supply taps the output transformer at a relatively low pulse potential point.

It may be readily apparent that the adjustable focus supply as described possesses a relatively low source impedance, which may in a practical example be of the order of approximately 1 megohm, and thus provides acceptable regulation of focus voltage whereby the extreme load variations with picture content inherent in the color kinescope operation do not adversely affect the color image reproduction. It will also be readily appreciated that this acceptable regulation characteristic of the novel supply is achieved with a minimum of wasted power. The power losses which would inhere in the use of a bleeder type focus supplying providing comparable regulation characteristics would be considerably greater than those accompanying use of the essentially inductive supply just described. Improvement in overall efficiency of the deflection and voltage supply system is thus a significant result of the use of the present invention for such purposes as the supply of focus voltage for a color kinescope.

Figure 2 illustrates a representative arrangement of coils 83 and 85 whereby the coupling therebetween may be conveniently varied to provide the focus voltage adjustment as described in connection with Figure 1. As illustrated, the two coils 83 and 85 are mounted on a common coil form, the hollow cylinder 86, in appropriately spaced relationship. A core of magnetic material may be provided in the form of an adjustably insertable slug 88, of a ferrite composition, for example. The slug 88 is preferably of a length such that in all positions of its adjustment the inductance of the coil 83 remains substantially constant, whereby such factors as raster width may be essentially independent of the focus voltage setting. In Figure 2, it may be noted that the slug is inserted in the coil 83 end of the coil form 86 and is of such a length relative to the intercoil spacing that a full range of adjustment between conditions of substantially no coupling between the coils and maximum coupling between the coils may be covered by varying the depth of slug insertion without substantially affecting the inductance presented by coil 83 to the high voltage transformer 63. It will be of course appreciated that the manner of mounting the coils 83 and 85 and varying the coupling therebetween as shown in Figure 2 is illustrative of one form of the invention only.

In Figure 3 a modification of the specific connections illustrated in Figure 1 is shown. The modification illustrates the adaptation of a focus supply in accordance with the present invention to cooperate with a horizontal centering circuit of the type shown in my co-pending application, Ser. No. 365,748, filed July 2, 1953 and entitled "Raster Centering Control," now U. S. Patent 2,784,344, issued March 5, 1957. In an embodiment of the invention disclosed in my aforesaid co-pending application, the use of D.-C. blocking capacitors in the connections between horizontal yoke and horizontal output transformer, and the use of a pair of chokes in the connections between the yoke and a centering potentiometer, permit the insertion of a D.-C. centering current into the deflection windings of the yoke with the advantages of preventing the flow of the centering current in the output transformer (thereby avoiding the possibility of saturating the output transformer core), and also permitting the isolation of the yoke from A.-C. ground potential (thereby allowing a connection of the yoke to the output transformer at a point above A.-C. ground potential to minimize "ringing" in the yoke). In my aforesaid co-pending patent, the possible use of either or both of the chokes as a raster width control is also indicated. In the modification of the present invention illustrated in Figure 3, such a centering circuit is illustrated with the coil 83 of the novel focus voltage adjusting system serving as one of the aforesaid chokes.

Referring to Figure 3 more specifically, it is noted that a resistance 97 is included in the D.-C. path leading from the plate of damper diode 65 to the B+ supply. An intermediate point on the resistance 97 is coupled to one of the horizontal yoke terminals "H" via the coil 83, while an adjustable tap 99 on resistance 97 is coupled to the other yoke terminal "H" via an adjustable inductance coil 95. By varying the position of the adjustable tap 99 on the resistance 97 the D.-C. applied to the yoke terminals H—H may be varied in magnitude and polarity to effect the desired raster centering adjustment. The coils 83 and 95, which have a high A.-C. impedance, effectively isolate the horizontal yoke from A.-C. ground potential, readily permitting the yoke connections to the output transformer 63 to be at points "T" and "W" above A.-C. ground potential (a type of connection which may often be desirable for minimizing ringing in the yoke). The focus supply 83, 85, 87, 89 operates in the same manner as described in connection with Figure 1, the adjustment of coupling between coils 83 and 85 providing focus voltage variation over the desired range. As indicated in the discussion of Figure 2 the coupling adjustment is preferably carried out in a manner which involves substantially no change in the inductance of coil 83 whereby raster width is independent of focus voltage adjustments. The variable inductor 95, however, may conveniently serve as the raster width control, varying the A.-C. impedance shunting the yoke and thereby varying the amplitude of the sawtooth current flowing through the yoke.

Having thus described my invention, what is claimed is:

1. In a cathode ray tube system, a variable voltage supply comprising the combination of a transformer, a damper tube circuit connected across a portion of said transformer, a first inductance, a second inductance inductively coupled to said first inductance, rectifying means, means for connecting said first inductance effectively in shunt with a portion of said transformer, means for connecting said rectifying means and said second inductance in series with said first inductance, and means for varying the coupling between said first and second inductances to vary the amplitude of the rectified output of said rectifying means.

2. Apparatus in accordance with claim 1 wherein said first and second inductances are mounted on a common coil form and wherein an adjustably positioned magnetic core in said coil form serves as said coupling varying means, the position and range of adjustment of said core in said coil-form being such that the amplitude of said rectifying means output is varied without varying the inductance value of said first inductance.

3. In a television receiver including a cathode ray tube having a focus electrode, and a deflection wave transformer, an adjustable focus supply comprising in combination a pair of mutually coupled inductance coils, a rectifier, means for coupling one of said pair of coils across a portion of said deflection wave transformer, means for connecting said rectifier in series with said pair of inductance coils, means for coupling said focus electrode to said rectifier, means for varying the coupling between said pair of inductance coils, a deflection yoke effectively coupled across a portion of said deflection wave transformer, and means for applying an adjustable unidirectional current to said yoke, said latter means including said one of said pair of inductance coils.

4. Apparatus in accordance with claim 3 wherein said pair of inductance coils are mounted on a common coil form and wherein said coupling varying means comprises an adjustably positioned magnetic core within said coil form, the position and range of adjustment of said core in said coil form being such that the coupling between said pair of inductance coils is varied by adjustment of the position of said core with substantially no concomitant variation of the inductance of said one coil.

5. In a television receiver including a cathode ray tube having an electrode with supply voltage requirements in a range extending between a first D.-C. potential and a second higher D.-C. potential, said receiver also including a deflection wave transformer subject to the periodic appearance of flyback pulses, apparatus for supplying said cathode ray tube electrode with a voltage variable in said range comprising, in combination, a first inductance, means for coupling said first inductance to a point on said transformer of flyback pulse potential of the order of said first unidirectional potential, a second inductance, a rectifier, means for serially connecting said rectifier and said first and second inductances, means for applying the output of said rectifier to said cathode ray tube electrode, and means for providing a variable coupling between said first and second inductances.

6. In a color television receiver including a kinescope having an electrode with supply voltage requirements in a range extending between a first D.-C. potential and a second higher D.-C. potential, said receiver also including a deflection wave transformer subject to the periodic appearance of flyback pulses and a deflection yoke coupled to said transformer, apparatus comprising the combination of a first inductance, means for coupling said first inductance to a point on said transformer of flyback pulse potential of the order of said first unidirection potential, a second inductance inductively coupled to said first inductance, a rectifier, means for serially connecting said rectifier and said first and second inductances, means for applying the output of said rectifier to said kinescope electrode, means for varying the amplitude of said rectifier output comprising means for varying the coupling between said first and second inductances, and means for applying a variable unidirectional current to said yoke, said latter means including said first inductance.

7. In a television receiver comprising a kinescope including a focus electrode, and a deflection wave transformer subject to the periodic appearance of flyback pulses, a focus voltage supply for developing a focus voltage for said focus electrode, said supply comprising in combination inductive means coupled to said transformer for deriving therefrom flyback pulses of a predetermined potential, additional inductive means inductively coupled to said first-named inductive means for stepping up the potential of said derived flyback pulses, a rectifier, means for applying said stepped up flyback pulses to said rectifier, said rectifier developing said focusing voltage from said stepped up flyback pulses, and means for adjusting said developed focus voltage comprising means for adjusting the pulse potential step-up effected by said additional inductive means.

8. A focus voltage supply in accordance with claim 7 wherein said last-named means comprises means for varying the inductive coupling between said pair of inductive means.

9. A focus voltage supply in accordance with claim 8 wherein said first-named inductive means comprises a coil effectively shunted across a portion of said transformer, wherein said additional inductive means comprises a second coil inductively coupled to said first-named coil and connected in series combination with said first-named coil and said rectifier, and wherein said inductive coupling varying means comprises a common, adjustably positioned, magnetic core for said first and second coils, the position and range of adjustment of said core being such that said developed focus voltage is varied by positioning adjustment of said core with substantially no change in the inductance of said first-named coil.

10. Apparatus in accordance with claim 9 also including a deflection yoke coupled to said deflection wave transformer, and means for applying a variable unidirectional current to said yoke through said first-named coil.

11. In a television receiver including a deflection wave transformer, an adjustable direct current voltage supply comprising, a first inductance coil having terminals connected across a portion of said deflection wave transformer, a second inductance coil having one terminal connected to one terminal of said first coil, a rectifier device and a capacitor connected in series and coupled from the other terminal of said second coil to the other terminal of said first coil, said first and second coils being inductively coupled, and means to vary said inductive coupling to vary the direct current voltage available at the junction between said diode and said storage capacitor.

12. In a television receiver including a kinescope having a focus electrode and including a deflection wave transformer, an adjustable direct current voltage supply comprising, a first inductance coil having terminals connected across a portion of said deflection wave transformer, a second inductance coil having one terminal connected to one terminal of said first coil, said first and second coils being inductively coupled, a rectifier device having one terminal connected to the other terminal of said second coil and having the other terminal connected to said focus electrode, and means to vary said inductive coupling to vary the voltage applied to said focus electrode.

References Cited in the file of this patent

UNITED STATES PATENTS

| | | |
|---|---|---|
| 2,438,359 | Clapp | Mar. 23, 1948 |
| 2,574,245 | Court | Nov. 6, 1951 |
| 2,588,659 | Pond | Mar. 11, 1952 |
| 2,637,832 | Rogers | May 5, 1953 |

UNITED STATES PATENT OFFICE
CERTIFICATE OF CORRECTION

Patent No. 2,867,750 January 6, 1959

Bernard V. Vonderschmitt

It is hereby certified that error appears in the printed specificati of the above numbered patent requiring correction and that the said Lette Patent should read as corrected below.

Column 3, line 66, for "2,752,550" read -- 2,752,520 --; column 4, line 46, for "Io. 2,769,110," read -- No. 2,769,110, --.

Signed and sealed this 19th day of April 1960.

(SEAL)
Attest:

KARL H. AXLINE
Attesting Officer

ROBERT C. WATSON
Commissioner of Patents